United States Patent [19]

Bentsen

[11] 3,971,396
[45] July 27, 1976

[54] PNEUMATIC RELAY
[75] Inventor: Louis J. Bentsen, Arlington Heights, Ill.
[73] Assignee: Honeywell Inc., Minneapolis, Minn.
[22] Filed: July 16, 1975
[21] Appl. No.: 596,688

[52] U.S. Cl. ................................ 137/82; 137/84
[51] Int. Cl.² ...................................... G05D 16/00
[58] Field of Search .................. 137/82, 84; 236/47

[56] References Cited
UNITED STATES PATENTS

| | | | |
|---|---|---|---|
| 3,297,044 | 1/1907 | Thorburn | 137/82 |
| 3,605,781 | 9/1971 | Joesting | 137/82 |

Primary Examiner—Alan Cohan
Attorney, Agent, or Firm—Trevor B. Joike; Henry L. Hanson

[57] ABSTRACT

A pneumatic apparatus or relay which, in one embodiment, maintains the output pressure at a fixed level until the signal pressure obtains a predetermined value at which time the output pressure varies according to the signal pressure and, in a second embodiment, maintains the output pressure at a first level, which may be essentially zero, until the signal pressure obtains a predetermined value at which time the output pressure assumes a second level until the signal pressure reaches a second predetermined value and then the output pressure varies according to the signal pressure.

14 Claims, 4 Drawing Figures

PNEUMATIC RELAY

BACKGROUND OF THE INVENTION

This invention relates to a pneumatic relay and in particular a relay adapted to control the position of a damper in a unit ventilator and more specifically the invention comprises an improvement of the invention disclosed in U.S. Pat No. 3,605,781.

In a unit ventilator control circuit, the outside air damper is typically closed until the rising space temperature enters the throttling range of the room thermostat. At this point the valve controlling the flow of heating media, which has heretofore been open, begins to close, and the damper is opened to a position to take in a fixed minimum percentage of outdoor air. This minimum percentage of outdoor air is maintained throughout the lower part of the throttling range as the valve is being closed. When the temperature begins rising through the upper part of the throttling range, the valve is closed completely and the percentage of outdoor air is gradually increased to 100% which corresponds to a fully opened damper. Many schemes have been devised to provide this hesitation action of the damper position; the Mueller U.S. Pat. No. 3,115,147 discloses one such scheme. The subject invention, however, provides a simpler and more compact and economical method of providing the minimum position hesitation functions for the damper position than know prior art devices.

SUMMARY OF THE INVENTION

The present invention, in one embodiment, is an improvement over the invention shown in the aforementioned U.S. Pat. No. 3,605,781 in that one of the valve means shown in that patent has been eliminated while the overall operation of the pneumatic relay is essentially maintained.

BRIEF DESCRIPTION OF THE INVENTION

Figure 1:
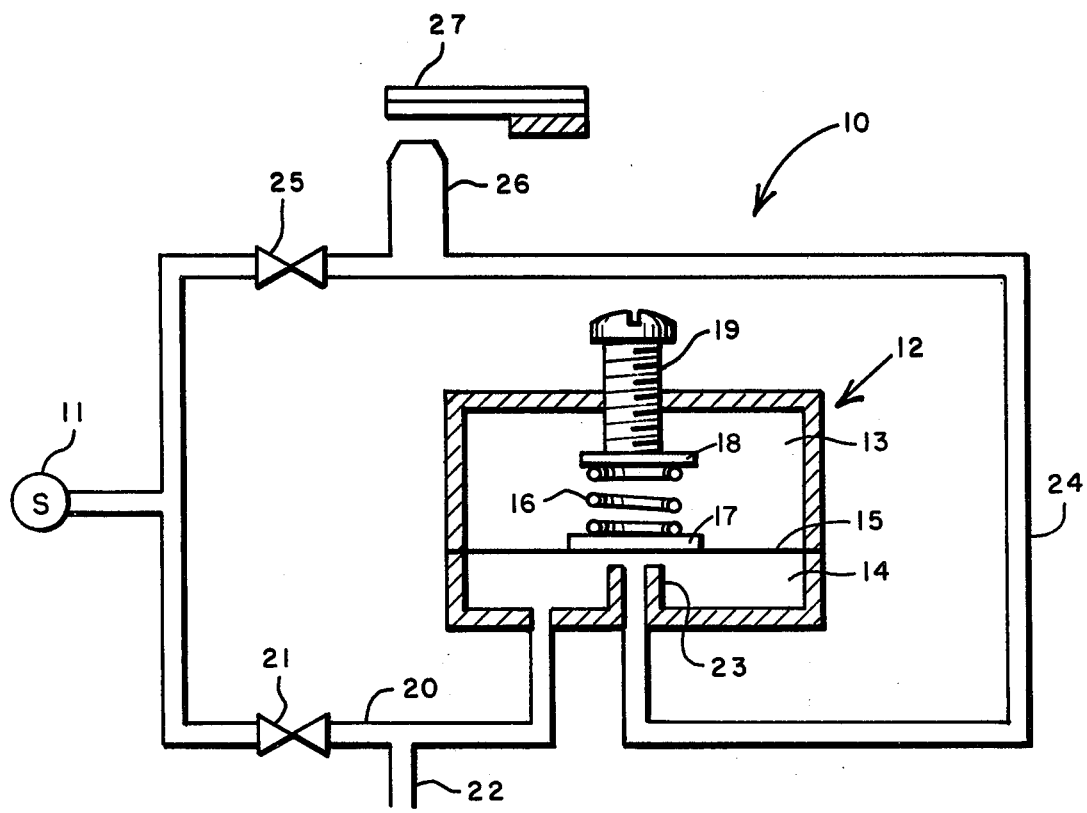
FIG. 1 is a schematic illustration of an apparatus for providing minimum position.

The apparatus shown in FIG. 1 is designed to provide an output pressure having a first level or minimum value until the signal pressure reaches a predetermined value at which time the output pressure varies according to the signal pressure. An input terminal 11 is adapted to be connected to a source of pneumatic pressure. A diaphragm module unit 12 is divided into a control chamber 13 and a flow chamber 14 by a diaphragm 15. A biasing spring 16 is located within the flow chamber and is positioned between a plate 17 riding on the diaphragm 15 and a second plate 18 which is attached to one end of an adjusting screw 19. The flow chamber 14 is connected by a pneumatic line 20 having a restriction 21 therein to the terminal 11. An output line 22 is connected to pneumatic line 20. The nozzle 23 within the flow chamber 14 of the diaphragm module 12 is connected by a line 24 having a restriction 25 therein to the terminal 11. A nozzle 26 is connected to the line 24 and cooperates with a bimetallic condition or temperature sensing device 27. The sensor 26-27 must be of sufficient capacity to bleed excess pressure in line 24.

Figure 2:
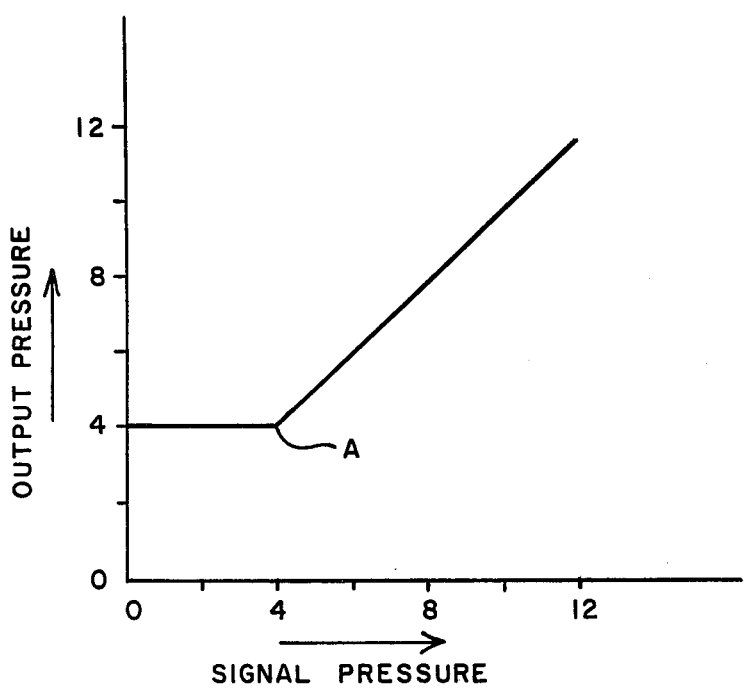
FIG. 2 is a diagram illustrating the relationship between the output pressure and the signal pressure with respect to the apparatus of FIG. 1.

FIG. 2 is a diagram which illustrates the operation of the circuit of FIG. 1. With the signal pressure, i.e. the pressure in line 24, equal to zero, the output pressure in line 22 is at a level which is determined by the setting of the screw 19 in conjunction to the spring 16. The excess pressure from the source terminal 11 is bled through the line 20, flow chamber 14, nozzle 23, line 24 and nozzle 26. As the bimetallic element 27 moves closer to the nozzle 26, the signal pressure in line 24 increases until it reaches a predetermined value, i.e. the pressure in line 22. Any further increase in the signal pressure in line 24 will result in an increase in the pressure in line 22 as shown in the graph of FIG. 2. Thus, in FIG. 2, the knee A of the curve is determined by the setting of the screw 19. If the screw were adjusted to allow a minimum output pressure of 5 psi, the knee A would occur at 5 psi of output pressure and 5 psi of signal pressure.

It should be noted at this point that a connection between the source terminal 11 and condition sensor 26-27 is not necessarily needed. If such a connection is not used, the sensor 26-27 will bleed off excess pressure in line 24 until the element 27 closes sufficiently against nozzle 26 to allow pressure in line 22 to vary according to the signal pressure in line 24.

However, the connection between terminal 11 and nozzle 26 is particularly useful in certain situations. For example, if it is desired to use this circuit to control both a heating valve and an outdoor air damper, a valve can be controlled from line 24, a summmer-winter changeover switch can be inserted into line 24 between the valve and nozzle 23 and the damper can be connected to line 22. For winter operation, the switch is operated to connect nozzle 26 to nozzle 23. As the signal pressure increases from zero, the outdoor air damper is held at its minimum position while the valve is modulated towards a closed position. At 4 psi of signal pressure, the valve is closed and the damper begins to modulate towards a fully opened position. During summer operation, the switch breaks line 24 and nozzle 23 is vented allowing the thermostat 26-27 to modulate the valve while the damper is held at its minimum regardless of signal pressure.

Figure 3:
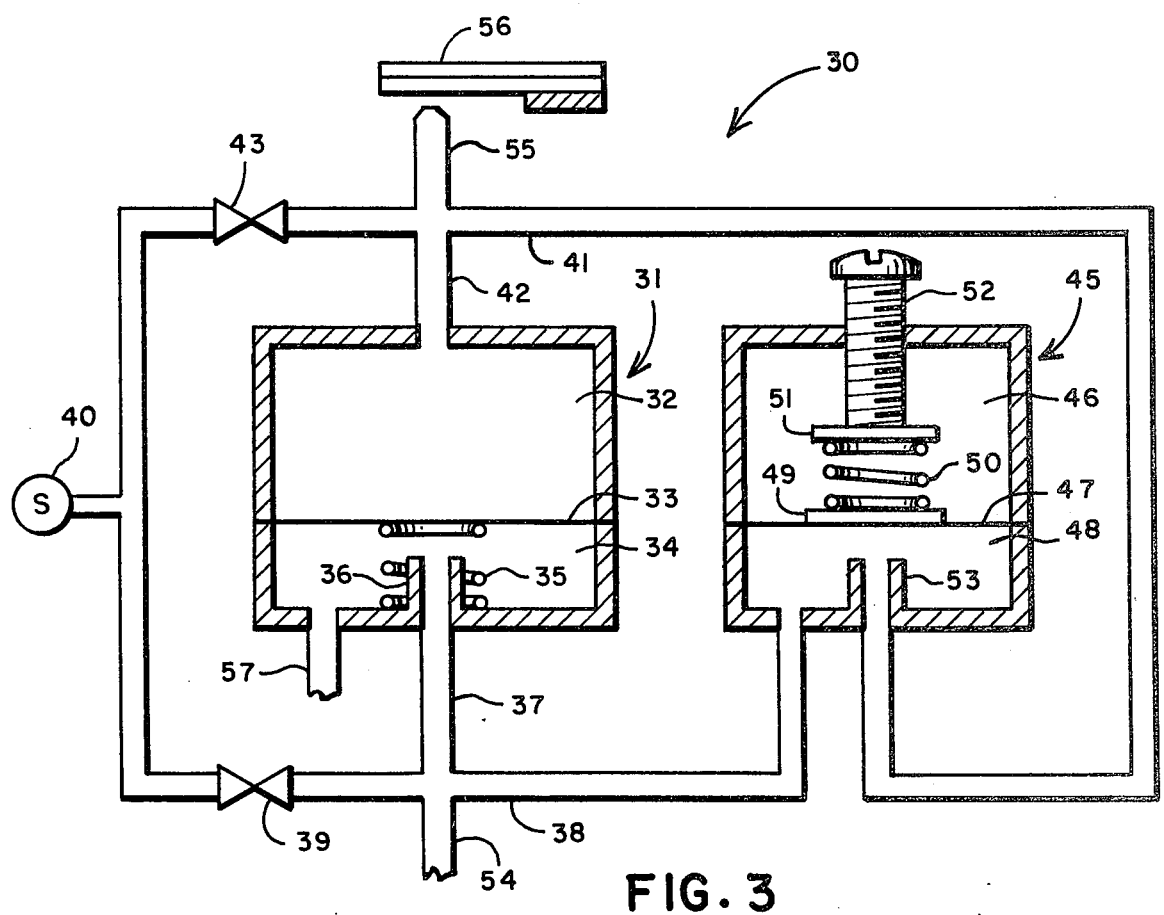
FIG. 3 is a schematic illustration of an apparatus for providing minimum position with hesitation.

The circuit 30 shown in FIG. 3 provides minimum position with hesitation. A first diaphragm module unit 31 has a control chamber 32 divided by a diaphragm 33 from a flow chamber 34. A biasing spring 35 is located in the flow chamber 34 to bias the diaphragm 33 away from the nozzle 36. The nozzle 36 is connected by a pneumatic line 37 and a pneumatic line 38 having a restriction 39 therein to a terminal means 40 which is adapted to be connected to a source of pneumatic pressure. The control chamber 32 is connected to a pneumatic line 41 by a pneumatic line 42. Line 41 is connected through a restriction 43 to the terminal 40.

A second diaphragm module 45 has a control chamber 46 divided by a diaphragm 47 from the flow chamber 48. A biasing spring 50 is located within the flow chamber and is positioned between plate 49 riding on diaphragm 47 and plate 51 attached to the adjusting screw 52. The nozzle 53 of the diaphragm module 45 is connected to the pneumatic line 41 and the flow chamber 48 is connected to the pneumatic line 38. The pneumatic line 38 has an output line 54 connected thereto and the pneumatic line 41 has a nozzle 55 connected thereto.

Figure 4:
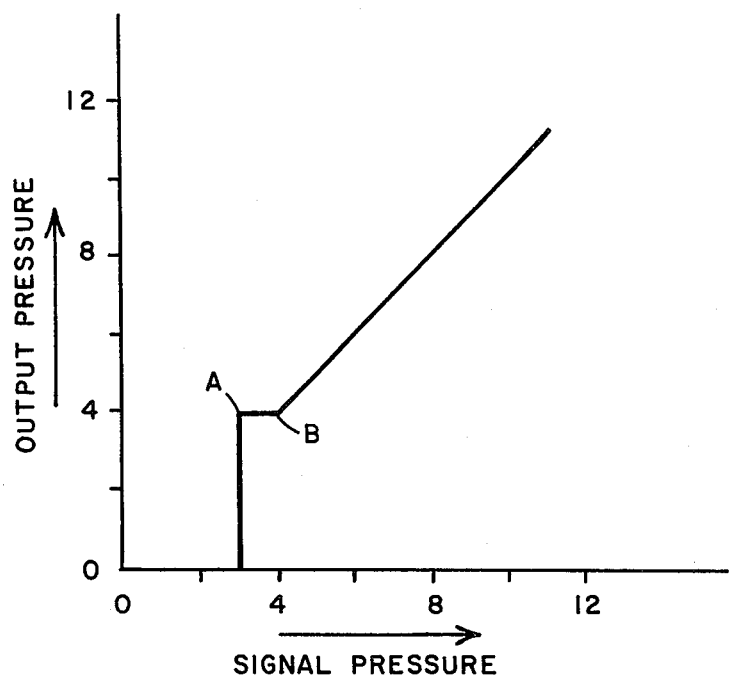
FIG. 4 is a diagram illustrating the relationship between the output pressure and the signal pressure with respect to the apparatus of FIG. 3.

FIG. 4 is a diagram which illustrates the operation of the circuit of FIG. 3. As long as the signal pressure is below a first predetermined value, e.g. 3 psi, the diaphragm 33 is biased away from the nozzle 36 by the spring 35 and the output line 54 is connected through line 37, nozzle 36, flow chamber 34 and port 57, which may be an exhaust port to atmosphere. The output pressure, therefore, is at a first level, e.g. 0. As the signal pressure increases and reaches 3 psi, the pressure in control chamber 32 is sufficient to overcome the bias of spring 35 and close the diaphragm 33 against the nozzle 36. The spring 35 establishes the 3 psi level. The pressure in the output line 54 immediately rises to a second level, e.g. 4 psi, and the diaphragm module 45 maintains the output pressure at 4 psi as determined by the spring 50, screw 52 biasing arrangement. The nozzle 55 operates in conjunction with a bimetallic element 56 to form a thermostat or condition sensor. The thermostat 55-56 arrangement must be of sufficient capacity to bleed the excess pressure supplied from the source terminal 40 through line 38 to flow chamber 48 of diaphragm module 45 to maintain the pressure within the chamber 48, and therefore the pressure in line 54, at 4 psi. When the signal pressure increases to a second predetermined level, e.g. 4 psi, the output pressure in line 54 begins to increase dependent upon the signal pressure in line 41.

Point A at the curve is determined by the spring 35 and the minimum pressure of 4 psi and Point B at the curve are determined by the spring 50, screw 52 bias arrangement.

As can be seen from the above mentioned U.S. Pat. No. 3,605,781, the third valving means shown in that patent has been eliminated but the hesitation and minimum position functions have been retained. This is accomplished by the use of a thermostat of sufficient capacity to bleed excess pressures supplied thereto.

While the subject invention has been described in the context of temperature controls and unit ventilators, it should be understood that this invention may be equally well utilized in many applications. Moreover, although specific apparatus has been shown in connection with the subject invention, certain variations can be made and still fall within the general scope of the invention. For example, a pneumatic bias means may be used instead of the spring or the combination of the spring and screw arrangements shown in the figures. Accordingly it is intended that the scope of the invention be limited only by the scope of the appended claims.

The embodiments of the invention in which an exclusive property or right is claimed are defined as follows:

1. A pneumatic relay comprising:
terminal means adapted to be connected to a source of pressure;
first housing means divided by a diaphragm into a control chamber and a flow chamber and having a nozzle in said flow chamber;
first means connecting said terminal means to said flow chamber for supplying pressure to said flow chamber;
output means connected to said first means for providing an output pressure dependent upon said pressure within said flow chamber;
biasing means within said first housing means acting against said diaphragm for establishing a minimum predetermined value for said pressure within said flow chamber; and,
second means including condition responsive means connected to said nozzle, said condition responsive means applying a signal pressure to said flow chamber and having sufficient capacity to bleed off said pressure supplied by said first means above said predetermined value until said signal pressure achieves a value substantially equal to said predetermined value
whereby said output pressure will be substantially equal to said predetermined value until said signal pressure attains said value substantially equal to said predetermined value at which time said output pressure will follow said signal pressure.

2. The pneumatic relay of claim 1 wherein said second means includes further means for connecting said nozzle to said terminal means.

3. The pneumatic relay of claim 2 wherein said first and said further means each comprise a restriction and wherein said output means is connected to said first means downstream of said restriction of said first means.

4. The pneumatic relay of claim 3 further comprising:
second housing means divided by a diaphragm into a flow chamber and a control chamber and having a nozzle in said flow chamber;
third means connecting said control chamber of said second housing means to said second means;
fourth means connecting said nozzle of said second housing to said first means downstream of said restriction for supplying pressure to said flow chamber of said second housing means; and,
port means connected to said flow chamber of said second housing means for bleeding said pressure within said flow chamber of said second housing means until said signal pressure attains a predetermined level,
whereby said second housing means provides hesitation maintaining said output pressure at a level below said predetermined value until said predetermined level of signal pressure is attained.

5. The pneumatic relay of claim 4 wherein said port means is an exhaust port connected to atmosphere.

6. The pneumatic relay of claim 5 wherein said condition responsive means comprises a thermostat having a thermostatic nozzle connected to said nozzle of said first housing means, a temperature responsive device for operation in conjunction with said thermostatic nozzle, and means for connecting said thermostatic nozzle to said further means downstream of said restriction.

7. The pneumatic relay of claim 3 wherein said condition responsive means comprises a thermostat having a thermostatic nozzle connected to said nozzle of said first housing means, a temperature responsive device for operating in conjunction with said nozzle and means for connecting said nozzle to said further means downstream of said restriction.

8. An apparatus for providing a minimum output pressure comprising:
terminal means adapted to be connected to a source of pressure;
first valve means having a flow chamber, a nozzle within said flow chamber, and closing means for seating against said nozzle;

first connecting means connecting said terminal means to said flow chamber for supplying pressure to said flow chamber;

output means connected to said first connecting means for providing an output pressure dependent upon said pressure within said flow chamber;

biasing means acting against said closing means for establishing a minimum predetermined value for said pressure within said flow chamber; and, condition responsive means connected to said nozzle for supplying a signal pressure to said flow chamber, said condition responsive means having means of sufficient capacity for bleeding off said pressure supplied by said first connecting means above said predetermined value until said signal pressure attains a value substantially equal to said predetermined value, whereby said output pressure will be substantially equal to said predetermined value until said signal pressure attains said value substantially equal to said predetermined value at which time said output pressure will follow said signal pressure.

9. The apparatus of claim 8 wherein said condition responsive means includes further means for connecting said nozzle of said first valve means to said terminal means.

10. The apparatus of claim 9 wherein said first connecting means and said further means each comprises a restriction and wherein said output means is connected to said first connecting means downstream of said restriction.

11. The apparatus of claim 8 further comprising:

second valve means having a flow chamber, a nozzzle within said flow chamber, and a closing means for seating against said nozzle;

second connecting means for applying a force to said diaphragm of said second valve means dependent upon said signal pressure;

third connecting means for connecting said nozzle of said second valve means to said first connecting means downstream of said restriction for supplying pressure to said flow chamber of said second valve means; and, port means connected to said flow chamber of said second valve means for bleeding said pressure within said flow chamber of said second valve means until said signal pressure attains a predetermined level, whereby said second valve means provides hesitation maintaining said output pressure at a level below said predetermined value until said predetermined level of signal pressure is attained.

12. The apparatus of claim 11 wherein said port means is an exhaust port connected to atmosphere.

13. The apparatus of claim 12 wherein said condition responsive means comprises a thermostat having a thermostatic nozzle connected to said nozzle of said first valve means, a temperature responsive element for operating in conjunction with said thermostatic nozzle and means for connecting said thermostatic nozzle to said terminal means and to said nozzle of said second valve means.

14. The apparatus of claim 10 wherein said condition responsive means comprises a thermostat having a thermostatic nozzle connected to said nozzle of said first valve means, a temperature responsive element for operating in conjunction with said thermostatic nozzle, and means for connecting said thermostatic nozzle to said further means downstream of said restriction.

* * * * *